July 5, 1927.

H. A. DENMIRE 1,635,073

BEAD PLACING RING

Filed March 20, 1924

Inventor
HAROLD A. DENMIRE.

By
Attorney.

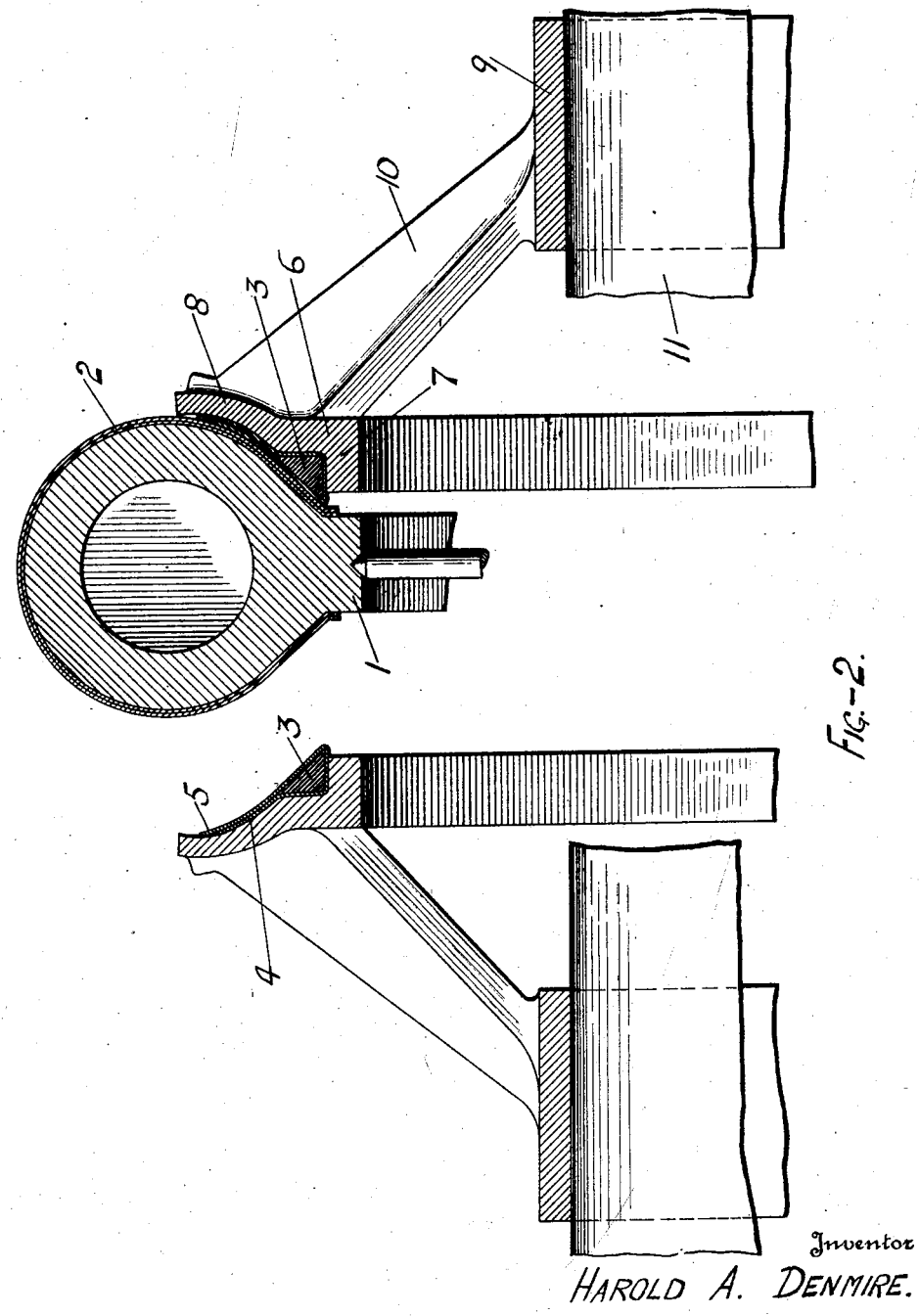

Patented July 5, 1927.

1,635,073

UNITED STATES PATENT OFFICE.

HAROLD A. DENMIRE, OF AKRON, OHIO, ASSIGNOR TO THE GENERAL TIRE AND RUBBER COMPANY, OF AKRON, OHIO, A CORPORATION OF OHIO.

BEAD-PLACING RING.

Application filed March 20, 1924. Serial No. 700,481.

This invention relates to the manufacture of pneumatic tire casings, and particularly to the placing therein, during the operations of building a tire, of the bead rings or cores, which are embedded within the inner edges of the casing and serve to hold the tire upon the rim. The present invention relates especially to the designing of a new form of bead placing ring, which is used in the incorporation of beads within the casing, which beads are provided with outwardly extending webs or strips of fabric known in the industry as "flipper strips."

It is a well known and commonly used expedient in the manufacture of tires to enclose the bead cores with a covering of one or more strips of fabric, the edges of which extend beyond the outer edge or apex of the bead and are pressed together to form a web which extends a short distance above the bead between the fabric layers of the carcass. Bead placing rings have been used heretofore, but, so far as known to me, they have embraced only the bead and the operation of applying the extending web of the "flipper strip" has been done by the spinning rolls of the machine or by hand rollers.

The object of my invention is to provide a device which will both apply the bead and also smoothly attach the extending web of the "flipper strip" to the side wall of the partially completed carcass.

In the drawings accompanying this application is shown one form of the invention but it will be understood that the details thereof are non-essential and may be varied within the scope of the invention as set forth in the attached claim.

In the drawings:

Figure 2 is a cross section through a core with one bead ring in position and with the other bead ring spaced from it.

Figure 1:
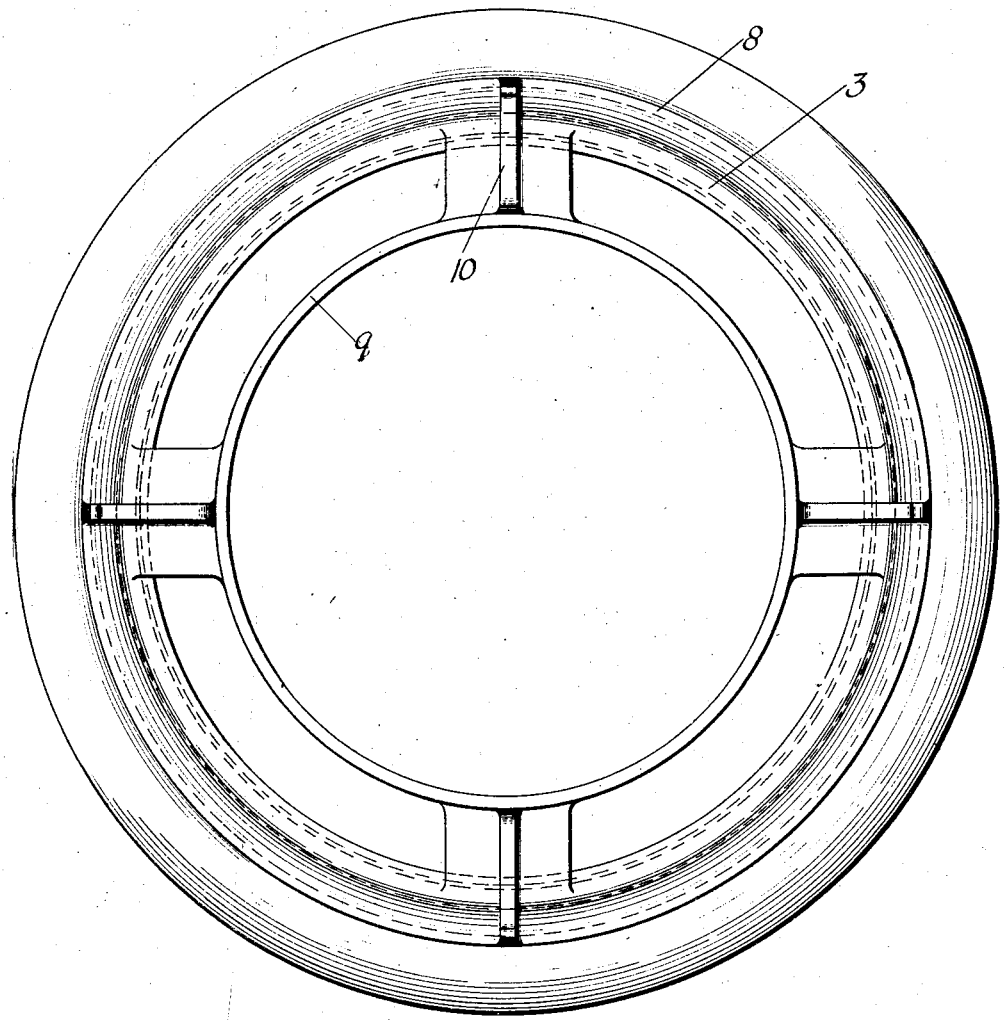
Figure 1 is a side elevation of a core with the bead setting ring in position therein.

The numeral 1 represents a tire core of any usual or standard construction on which the carcass is built. As will be understood by those familiar with the art, this core is mounted upon a stand or upon the shaft of a tire making machine. 2 represents the plies of fabric which have been placed over the core and smoothly applied thereon to form the under-bead plies.

The tire beads are indicated by the numerals 3. As illustrated, they are of the straight side or inextensible type, but the invention may be applied to beads of the extensible clincher type, if desired. The bead covering strips of fabric are indicated by the numeral 4, and may be of one or more plies surrounding the beads and extending above the apex of the beads to form the web or "flipper strip" 5.

In applying the beads to the side of the tire I employ bead setting rings 6 the inner faces or those faces adjacent the core being formed with recesses or angular seats or ledges 7 in each of which a bead may be seated. The ring is formed with a radially extending flange 8, the inner surface of which is curved as shown to support the web 5 and fit against the side of the partially finished carcass or outwardly of above the bead, the flange extending to approximately the median line of the core.

The bead rings are arranged to be supported in any suitable manner on either side of the tire core. Any well known or practical means for so locating the bead rings may be employed. In the present instance use is made of the centering ring 9, which will fit and slide upon any portion of the machine concentric with the core, and which is connected to the bead ring by the arms 10, this portion of the machine being indicated by the numeral 11. The bead rings being pressed against the side of the core will not only position the beads but will also smoothly apply the web of the "flipper strip" to the side or sides of the fabric constituting the partially completed tire.

It is obvious that modifications and changes may be made in embodiments of the invention and it is not limited to conformity with the detailed showing and description herein contained.

What is claimed is:

A ring for applying beads having outwardly extending fabric webs thereon, to an unfinished tire carcass upon a core, said ring having a seat of a diameter equal to the interior diameter of the bead in the completed carcass, an outwardly extending flange extending about the circumference of the ring and having a diameter equal to approximately the diameter of the median line of the core, the flange fitting against the outer surface of the bead and the outer curvature of the core above the bead and adapted to support the outwardly extending web and apply it to the core at the same time that the bead is applied to the core by pressure exerted upon the ring, and means to center the ring with respect to the core.

HAROLD A. DENMIRE.